United States Patent [19]
Strauss

[11] Patent Number: 5,689,335
[45] Date of Patent: Nov. 18, 1997

[54] APPARATUS AND METHOD FOR HETERODYNE-GENERATED TWO-DIMENSIONAL DETECTOR ARRAY USING A SINGLE ELEMENT DETECTOR

[75] Inventor: Charlie E. Strauss, Santa Fe, N. Mex.

[73] Assignee: The Regents of the University of California, Los Alamos, N. Mex.

[21] Appl. No.: 540,434

[22] Filed: Oct. 10, 1995

[51] Int. Cl.$^6$ .................................................. G01B 9/02
[52] U.S. Cl. ................................. 356/349; 359/191
[58] Field of Search ........................ 356/349, 346; 359/191

[56] References Cited

U.S. PATENT DOCUMENTS

| | | | |
|---|---|---|---|
| 3,571,507 | 3/1971 | Korpel | 359/191 |
| 3,858,203 | 12/1974 | Constant | 356/28 |
| 4,305,666 | 12/1981 | Becherer et al. | 356/349 |
| 5,353,109 | 10/1994 | Langdon et al. | 356/349 |

Primary Examiner—Samuel A. Turner
Attorney, Agent, or Firm—Samuel M. Freund

[57] ABSTRACT

Apparatus and method for heterodyne-generated, two-dimensional detector array using a single detector. Synthetic-array heterodyne detection, permits a single-element optical detector to behave as though it were divided into an array of separate heterodyne detector elements. A fifteen-element synthetic array has successfully been experimentally realized on a single-element detector, permitting all of the array elements to be read out continuously and in parallel from one electrical connection. A $CO_2$ laser and a single-element HgCdTe photodiode are employed. A different heterodyne local oscillator frequency is incident upon the spatially resolvable regions of the detector surface. Thus, different regions are mapped to different heterodyne beat frequencies. One can determine where the photons were incident on the detector surface even though a single electrical connection to the detector is used. This also prevents the destructive interference that occurs when multiple speckles are imaged (similar to spatial diversity). In coherent LIDAR this permits a larger field of view. An acoustooptic modulator generates the local oscillator frequencies and can achieve adequate spatial separation of optical frequencies of the order of a megahertz apart.

4 Claims, 4 Drawing Sheets ns5,689,335

APPARATUS AND METHOD FOR HETERODYNE-GENERATED TWO-DIMENSIONAL DETECTOR ARRAY USING A SINGLE ELEMENT DETECTOR

FIELD OF THE INVENTION

The present invention relates generally to heterodyne (or coherent) detection and, more particularly, to the use of optical heterodyne detection for transforming a single-element optical detector into a coherent array. The invention was made with government support under Contract No. W-7405-ENG-36 awarded by the U.S. Department of Energy to the Regents of The University of California. The government has certain rights in the invention.

BACKGROUND OF THE INVENTION

Coherent optical heterodyne detection is well known. An incident optical signal is mixed with a coherent reference frequency, called the local oscillator (LO) frequency, on an optical detector resulting in an electrical signal at the difference of the optical frequencies (the beat frequency). This can be contrasted to the more common form of optical detection, called direct detection, wherein there is no LO present, but instead the incident signal photons directly stimulate an electrical signal in the detector whose amplitude is proportional to the optical power of the signal. Principal advantages of heterodyne detection include significant gain in the detected signal because the amplitude of the electrical signal is proportional to the electric field of the optical signal multiplied by the electric field of the LO which can be made intense. Another advantage of the heterodyne technique is that noise due to background light can effectively be removed because the optical frequency of the signal source can be resolved electronically, relative to the LO optical frequency, to the line-width of the sources employed.

An array detector system has two clear advantages over single-element detection. The first is common to both heterodyne detection and to direct detection and provides multiple channel detection for imaging, wave-front sensing, or for any sort of multiple-channel signal. The second is to provide a means for spatially integrating the signal in heterodyne detection in order to reduce speckle noise (also known as phase noise, or clutter). Spatial integration of signal having an unknown, nonuniform phase front is not possible using conventional, single-element detectors because heterodyne detection is phase sensitive: the detection efficiency is degraded when the LO and the signal wave fronts are not spatially coherent.

For example, light scattered from any optically rough surface, propagated through a turbulent atmosphere or distorted by imperfections of an optical system, contains phase speckle (a random assortment of nonuniform phase fronts) which will be present in the signal at the detector surface. Illuminating the single-element detector with a uniform LO beam and a speckled signal will result in poor overall detection efficiency since the electrical beat signal generated from different regions of the wavefront will contain contributions with different interfering phases.

Both coherent imaging and spatial averaging can be achieved by using a multielement detector having parallel connections to the separate outputs. In such an apparatus, the parallel outputs of the multielement detector must be separately amplified and measured because, unlike direct detected signals, heterodyne signals are oscillating and cannot, in general, be coherently summed.

Accordingly, it is an object of the present invention to provide an apparatus and method such that a single-element optical detector may behave as if its surface is divided into an array of independent heterodyne detector elements, but having the signals from all the synthetic elements emerging on a single electrical connection.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus for heterodyne detection of an optical signal may include in combination: a detector for receiving the optical signal, the detector having a single electrical output; means for illuminating the surface of the detector with at least two substantially distinct optical frequencies having sufficient spatial separation (dispersion) therebetween, such that a chosen portion of the surface of the detector has associated with it a chosen, substantially distinct frequency; and means for receiving and measuring the beat frequencies generated between the at least two distinct optical frequencies and the optical signal on the single electrical output of the detector; whereby the intensity and phase profile for the optical signal incident on said detector may be produced.

In another aspect of the present invention, in accordance with its objects and purposes, the method for heterodyne detection of an optical signal hereof may comprise the steps of: receiving the optical signal on a detector having a single electrical output; illuminating the surface of the detector with at least two substantially distinct optical frequencies having sufficient spatial dispersion therebetween such that a chosen portion of the surface of the detector has associated with it a chosen, substantially distinct frequency; receiving and measuring the beat frequencies generated between the at least two distinct optical frequencies and the optical signal on the single electrical output of the detector; and obtaining the spectrum of the measured beat frequencies; whereby the intensity and phase profile for the optical signal incident on the detector is generated.

Benefits and advantages of the present invention include an apparatus for coherent imaging and spatial averaging which, by contrast to common multielement heterodyne detection systems which require parallel connections to separate outputs, requires only a single electrical output, thereby greatly simplifying the detector. The present apparatus is barely more complex than conventional apparatus for heterodyne detection which do not have any array properties.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION

Briefly, the present invention includes a single-element detector which acts as if its surface were divided into an array of separate detector elements wherein one can determine the regions on the surface where the photons were incident. Because the device behaves as if it were a multielement detector, it is referred to as a synthetic array. A different heterodyne local oscillator frequency is caused to be incident on each or any resolvable region of the detector surface in order to interrogate a narrow-band optical signal also incident on the detector. Different regions of the detector are thereby mapped into different heterodyne beat frequencies. All synthetic-array elements are read out continuously and in parallel through a single electrical connection. It should be mentioned that the present invention may be practiced using a multielement array as well; however, only a single-element detector is required to achieve the benefits of a synthetic array.

Figure 1:
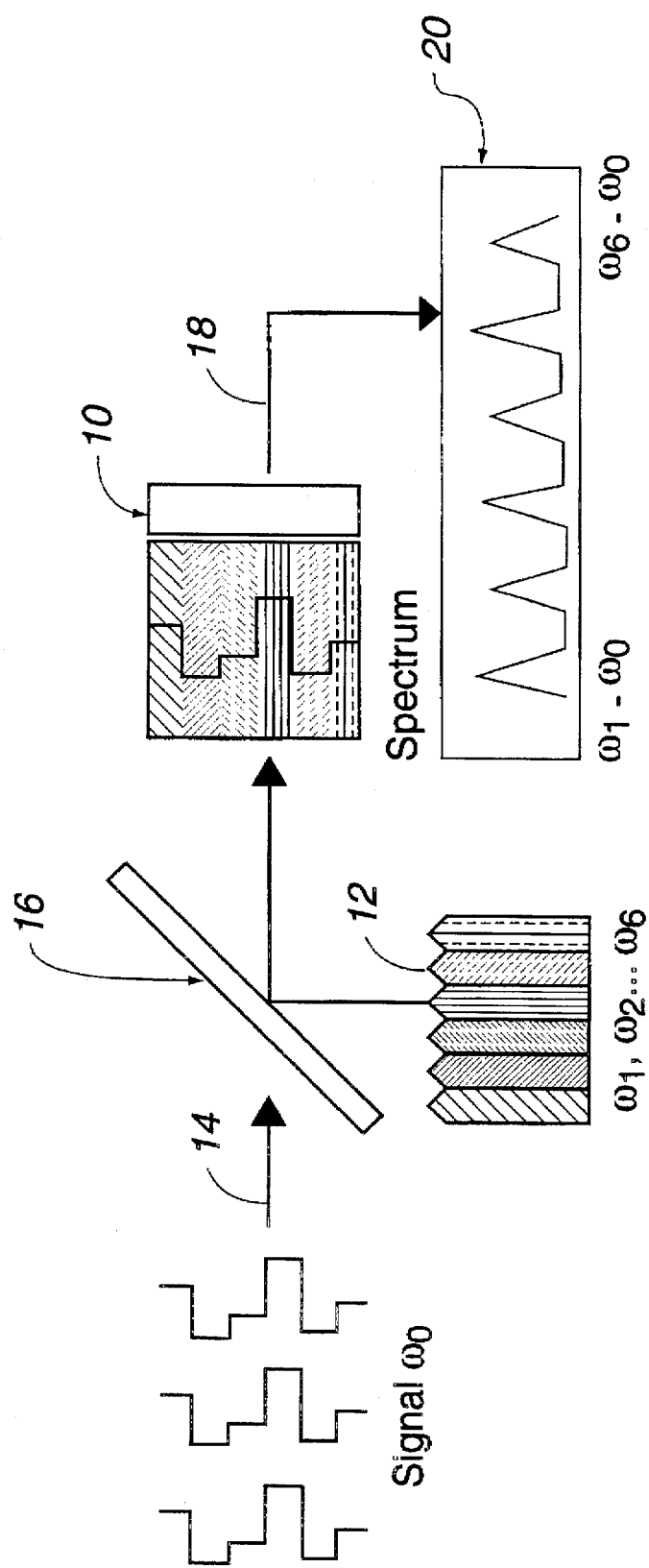
FIG. 1 illustrates the concept of the present invention, showing a single-frequency signal and a group of spatially distinct local oscillator frequencies incident on a single detector where a series of difference frequencies are generated, each frequency mapping to a different spatial location on the detector.

Reference will now be made in detail to the present preferred embodiments of the invention, examples of which are illustrated in the accompanying drawings. Similar or identical structure is identified with identical callouts. Turning now to FIG. 1, the synthetic-array concept of the present invention is illustrated. The surface of a detector, 10, is shown illuminated by spatially distinct, local oscillator, optical frequencies, 12. A single-frequency optical signal, 14, having amplitude and phase information encoded across its wavefront is caused to overlap discrete optical frequencies, 12, on the detector surface by means of partially reflecting mirror, 16. As a result of the mixing characteristics of detector, 10, there will be numerous beat frequencies, 18, emerging therefrom on the single detector output which can be identified and measured by spectrum analyzer, 20. Because the LO optical frequency at each region on the detector is substantially distinct from that of neighboring regions, the resulting beat frequency between it and signal, 14, is also distinct. Thus, the signal arising from each region is carried by its distinct beat frequency, and the location on the detector surface that a particular beat frequency arose may be determined. In many applications, such as spatial averaging, it will be unnecessary to spectrally resolve the electrical output signal.

Figure 2:
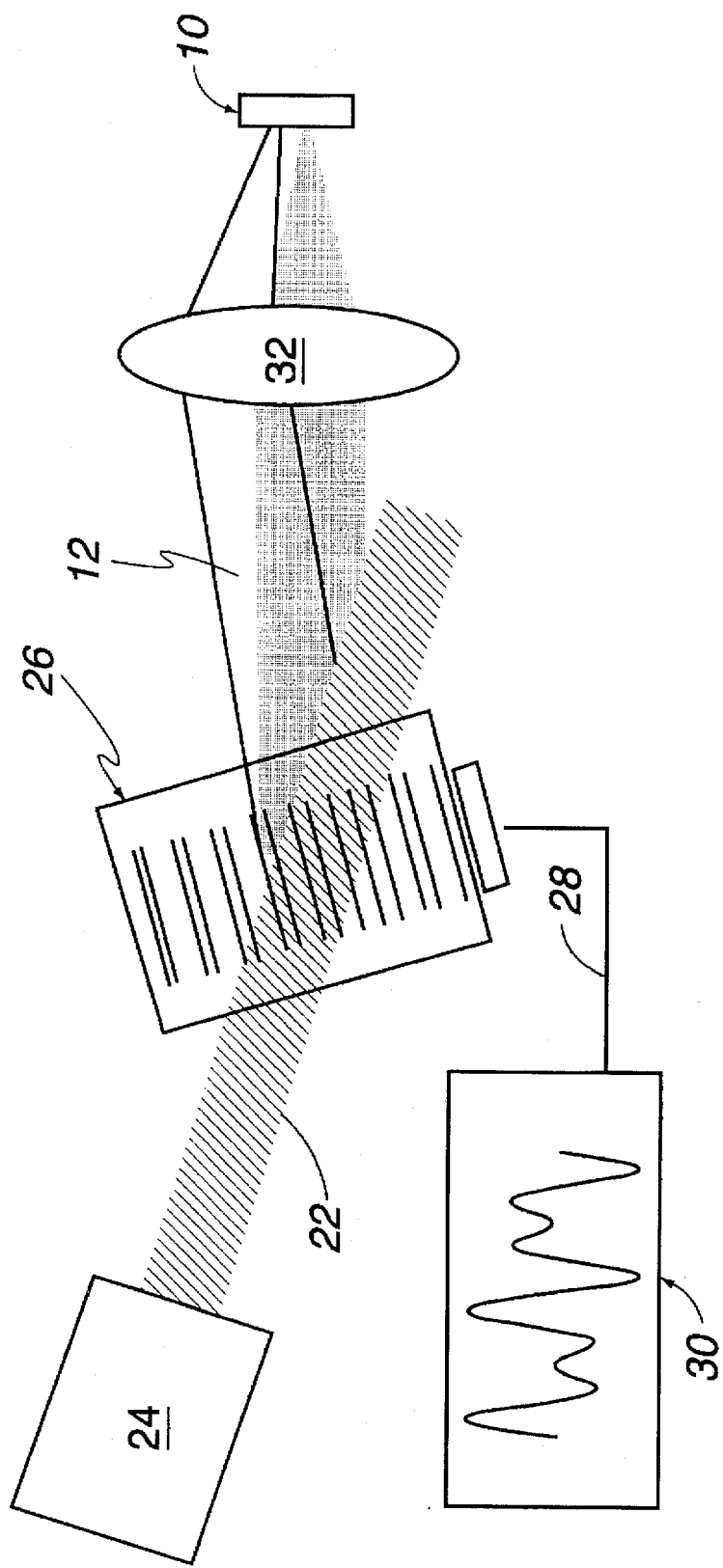
FIG. 2 is a schematic representation of the use of an acoustooptic modulator for generating multiple, spatially resolvable beams.

In FIG. 2, the application of an acoustooptic modulator for introducing a plurality of frequency shifts into a single, preferably, but not necessarily, substantially monochromatic laser beam directed thereinto and deflecting the frequency-shifted light beams to form a plurality of beamlets, is illustrated. The plurality of beamlets so generated is illustrated in FIG. 1 as optical frequencies, 12, and comprises the local oscillator beam. Light, 22, from laser source, 24, is directed into acoustooptic modulator (AOM), 26, also known as an acoustooptic deflector or acoustooptic frequency shifter, which is driven with an RF input, 28, containing at least two frequencies from source 30. A property of the AOM is that each deflected beamlet is shifted in its optical frequency from the optical frequency of the input beam by an amount equal to the RF frequency corresponding to that beamlet. The LO can be turned off by turning off the RF input to AOM, 26. Thus, three properties of the AOM are exploited in the present invention: deflection, frequency shifting, and modulation.

A lens system, 32, directs the beamlets onto the detector surface, 10. The number of resolvable regions directed onto the surface of detector, 10, by lens system, 32, is theoretically limited only by the diffraction resolution of the optical system employed. Typically, this will be defined by the aperture of the AOM (acoustooptic deflectors are often specified according to the "number of resolvable spots" figure of merit).

The multiple RF frequencies driving the AOM may be generated by a single digital arbitrary function generator, 30. There is a practical note in driving the AOM with more than two frequencies. Because the limiting feature of some modulator designs is peak voltage and not average power, the relative phases of the electrical driving frequencies should be set so as to minimize their periodic constructive interference. It was found that randomly assigning chosen phases to the RF frequencies greatly reduces the required dynamic range of the RF signal.

Having generally described the invention, the following examples illustrate the specific details thereof.

EXAMPLE 1

Figure 3:
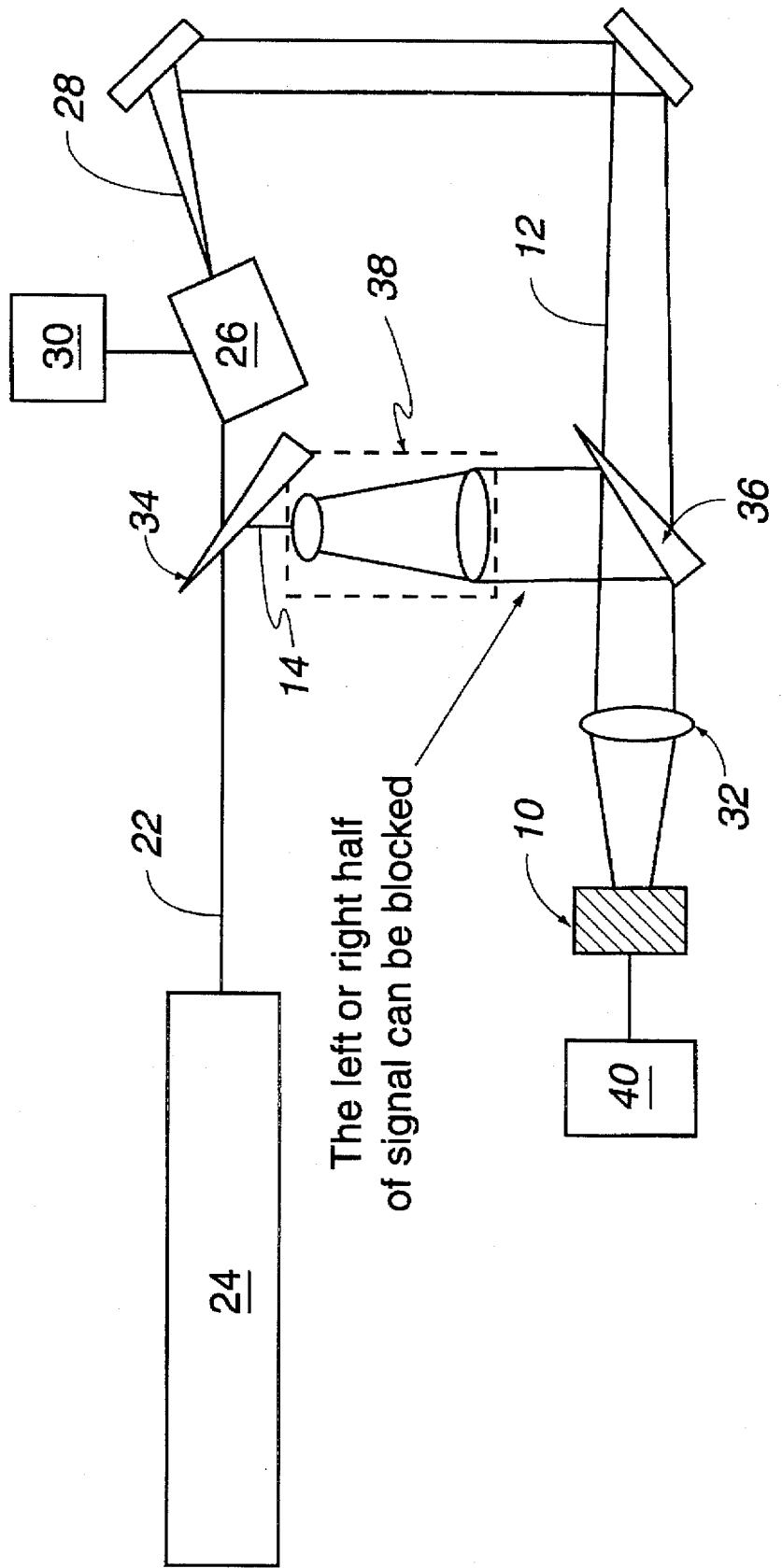
FIG. 3 is a schematic representation of one embodiment of the apparatus hereof showing the optical components utilized to demonstrate a two-element synthetic array.

FIG. 3 is a schematic representation of the apparatus used to demonstrate the above-described concept in the infrared region of the electromagnetic spectrum; a single-element detector is shown to behave as if it were a synthetic two-element detector. The nominally 10.6 μm output, 22, (P20 line) from cw waveguide $CO_2$ laser, 24, is directed through traveling-wave AOM, 26, (germanium) where its frequency is shifted. The beam was not focused into modulator, 26, but rather was collimated to 3.5 mm in diameter (FWHM Gaussian). Modulator, 26, was driven with less than 0.1 W of RF power at two separate frequencies, 25 and 29 MHz. The AOM output beam, 28, contains two new wavelengths; 10.6 μm upshifted by 25 MHz and 10.6 μm upshifted by 29 MHz, which deviate from the input beam by 46 and 54 mrad, respectively. Because of the angular dispersion of the beams, the 25 MHz-shifted light was focused by lens system, 32, slightly to the side of, although partly overlapping the 29 MHz-shifted light on the surface of photovoltaic HgCdTe detector, 10. These formed the LO reference beam, 12. Signal source, 14, was a portion of the unshifted 10.6 μm light directed onto detector, 10, by beamsplitters, 34, and 36, and expanded and diverged by optical system, 38. Signal, 14, was then adapted by optical system, 32, to be coextensive with LO reference beam, 12, on the detector surface, 10.

Four electrical frequencies emerge from detector, 10: the dc superposition of the signal and the LO beams (dominated by the LO beam); a 4 MHz beat due to the residual spatial overlap between the 25 and 29 MHz beat; a beat resulting from the left half of the signal and 25 MHz-shifted light; and a similar beat resulting from the 29 MHz-shifted light and the right half of the signal. The signal was sampled and its Fourier transform taken directly on the digital oscilloscope, 40. The 4 MHz signal was found to be a useful diagnostic for aligning the two reference frequencies onto the detector element.

To demonstrate position-sensitive detection using the present apparatus, either the left or right half of the 10.6 μm signal beam was blocked, and a drop in the 25 or 29 MHz signal, respectively, was observed with an extinction ratio in excess of 10 when blocking either side. The two-pixel device thus images the position information, thereby acting as a spatial array. Although only two frequency channels were employed in this example, it is clear that more can be generated.

EXAMPLE 2

Figure 4:
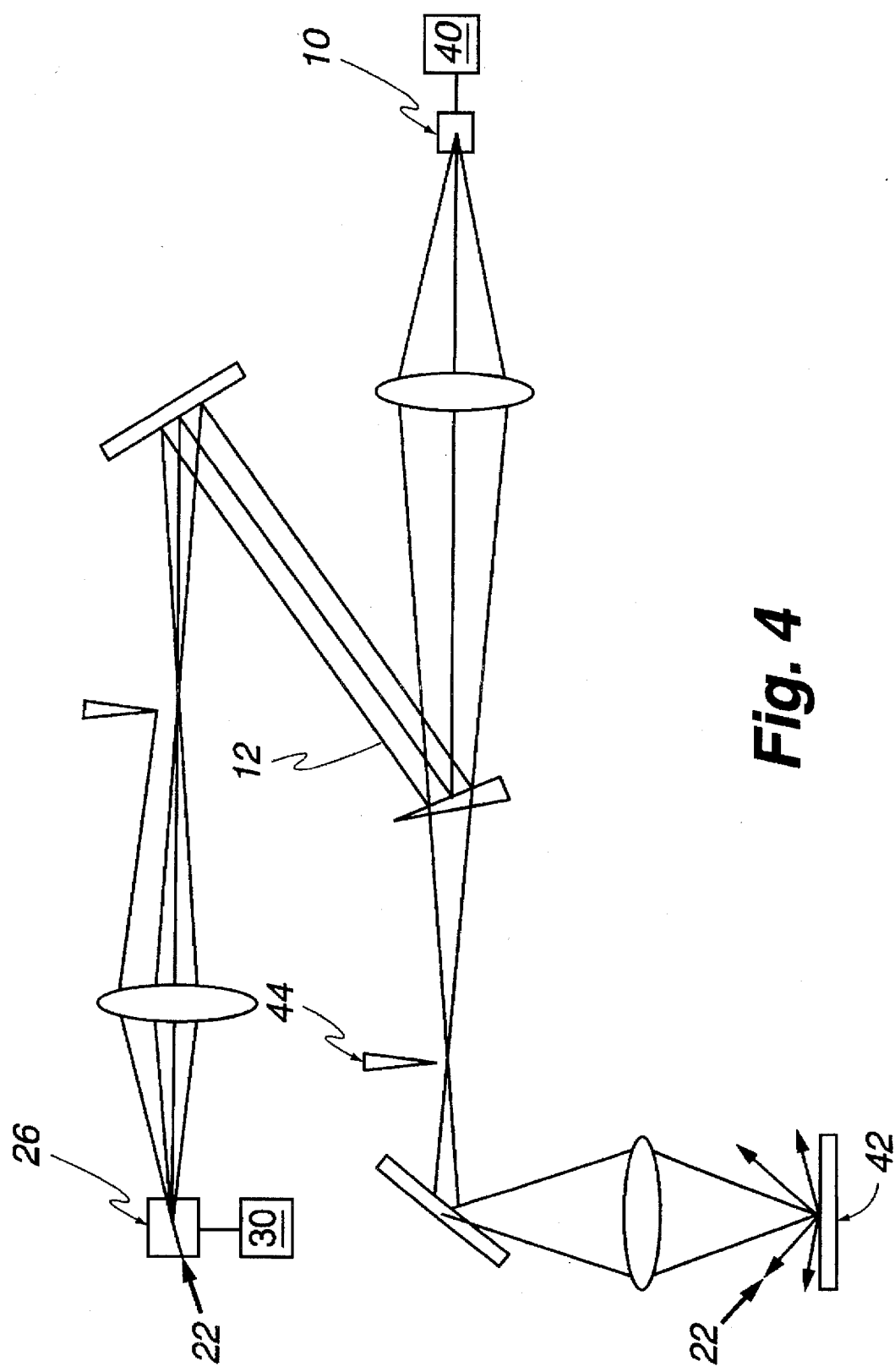
FIG. 4 is a schematic representation of a second embodiment of the apparatus hereof.

An alternative embodiment of the present invention is illustrated in FIG. 4 hereof. Up to 15 resolvable LO beamlets have been directed onto a 1 mm wide detector surface. The heterodyne efficiency has been improved by matching the optical Lagrange Invariant (also known as the emittance, or phase space) of the LO and signal beams. The embodiment illustrated in FIG. 3 efficiency. However, it was less sensitive to misalignment and optical imperfections, and thus might be preferred for applications where those characteristics are desirable over maximum signal strength. Other embodiments which maximize different characteristics are possible; for example, one may wish to maximize the heterodyne efficiency under conditions where the curvature or average intensity profile of the signal beam was different from that of the LO beam. Shown in FIG. 4 is nominally 10.6 μm light, 22, from a single laser source (not shown) being directed to acoustooptic modulator, 26, and to target, 42. Modulator, 26, was driven simultaneously at eight separate frequencies, 12, centered at 27 MHz and spaced about 2 MHz apart. Target, 42, was a slowly rotating sandpaper disk which introduces a distorted speckle wavefront. Heterodyne efficiency was increased and balanced for all channels by matching the phase-space emittance of the imaged rotating disk to the phase-space spanned by the discrete channels; that is, the imaged spot size contained eight speckle lobes. There were several bands of electrical frequencies present on detector, 10: the dc level of the combined light (which was dominated by the LO beam), harmonics of a 2 MHz beat due to the residual spatial overlap between different LO frequencies, and the beats (in the 27 MHz band) for each of the LO modulation frequencies due to the overlap of the signal and the LO. The 2 MHz signal was a useful diagnostic for aligning the reference frequencies onto the detector element, but was ultimately filtered out using preamplifiers. The intensities of the different frequencies were measured, 40, either by using an electronic spectrum analyzer, or by digitally Fourier transforming a sampled signal. Razor blade, 44, located in the relayed image plane of detector, 10, along the signal beam was used to demonstrate position-sensitive detection. Upon moving this blade through the signal beam, an extinction ratio across the frequencies in excess of ten was observed. This measurement shows that LO frequencies spaced more than about 2 MHz apart can be resolved.

The present synthetic array has three drawbacks not present in a true multiple-element detector array. First, instead of multiple small detectors one has a single large-area detector and consequently a greater capacitance. While this may ultimately limit the total array size, the limit may be sufficiently large so as not to matter; for example, a 0.25 mm² HgMnTe photovoltaic detector typically has a bandwidth in excess of 50 MHz. Second, if one intends to resolve the synthetic-array elements (i.e., use it in an imaging mode), then the LO shot noise from all the channels appears in each channel. Third, if one instead integrates over the synthetic pixel magnitudes (i.e., use it in a spatial averaging mode), then the noise bandwidth is increased by the number of pixels. Since speckle often dominates the noise (presumably why one desires to spatially average), this may not be a serious drawback.

It should be mentioned that the laser employed was not a single-mode laser. Although the modes interfere with one another and can reduce the signal level depending on the pathlength difference between the signal and reference beam, the present results demonstrate that a narrow-band beat can be obtained from a broadband laser.

Three other means are available for producing LO beamlets which are spatially distinct and have different optical frequencies. First, the outputs of a bank of two or more lasers, each tuned to a slightly different frequency could be used, though this approach offers formidable technical difficulties and expense when compared with the AOM. Second, a spatial light modulator (SLM) array with each array element being driven at a different frequency could be employed with a single laser to generate spatially distinct beamlets at different frequencies. Presently, commercially available SLMs have modulation rates which are much slower than that for an AOM. They also require multiple electrical connections and driver signals. By contrast, an AOM requires but a single RF connection. Third, a broadband or multimode laser could be dispersed. Presently, dispersing a broadband laser by employing a grating is not possible. The reason for this is that two beamlets are considered to be distinct if their angular separation exceeds the diffraction-limited divergence of the combined optical system. For any reasonable-sized grating, the required frequency separation to produce resolvable spots will be a large fraction of the optical frequency. Consequently, the resultant beat frequency between the signal and the LO beamlets will exceed the response bandwidth of currently known optical detectors. By contrast, an AOM produces large angular deviations of the beams, but relatively small frequency shifts (typically a few parts per million of the optical frequency).

The foregoing description of the invention has been presented for purposes of illustration and description and is not intended to be exhaustive or to limit the invention to the precise form disclosed, and obviously many modifications and variations are possible in light of the above teaching. The synthetic array permits new detection modes. For example, after reading the present disclosure, one having ordinary skill in the art could dynamically change the heterodyne gain on each synthetic element individually simply by boosting the power in that frequency channel at the AOM driver, or dynamically changing the pixel sizes, overlap, number, and positions, adapting to differing speckle sizes or tracking a moving target. Additionally, a second acoustooptic modulator may be employed at right angles to create a two-dimensional synthetic array, and fast spatial light modulators would provide another approach to a two-dimensional array. It should be mentioned that the above-described examples were performed in the infrared region of the optical spectrum. For visible wavelengths, typical detectors have about ten times faster rise time and the focal waist can be about ten times smaller, thereby permitting orders-of-magnitude denser and larger arrays than for the mid-IR. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A synthetic-array apparatus for heterodyne detection of an optical signal, which comprises in combination:

a. a detector for receiving the optical signal, said detector having a single electrical output;

b. means for illuminating the surface of said detector with at least two substantially distinct optical frequencies having sufficient spatial separation therebetween, such that a chosen portion of the surface of said detector has associated with it a chosen, substantially distinct frequency; and c. means for receiving and measuring the beat frequencies generated between the at least two distinct optical frequencies and the optical signal on the single electrical output of said detector; whereby the intensity profile for the optical signal incident on said detector is generated.

2. The synthetic-array apparatus for heterodyne detection of an optical signal as described in claim 1, wherein said means for illuminating the surface of said detector with at least two substantially distinct optical frequencies having sufficient spatial dispersion therebetween includes acoustooptic modulators.

3. A method for heterodyne detection of an optical signal, which comprises the steps of:

a. receiving the optical signal on a detector having a single electrical output;

b. illuminating the surface of the detector with at least two substantially distinct optical frequencies having sufficient dispersion therebetween such that a chosen portion of the surface of the detector has associated with it a chosen, substantially distinct frequency; and c. receiving and measuring the beat frequencies generated between the at least two distinct optical frequencies and the optical signal on the single electrical output of the detector.

4. The method for heterodyne detection of an optical signal as describe in claim 3, further comprising the step of obtaining the intensity and phase profile for the optical signal incident on the detector.

\* \* \* \* \*